United States Patent Office

3,577,310
Patented May 4, 1971

3,577,310
METHOD OF BONDING OLEFIN ELASTOMER TO TEXTILE FIBER AND PRODUCT OBTAINED
Luigi Torti and Guido Bertelli, Ferrara, Italy, assignors to Montecatini Edison S.p.A., Milan, Italy
No Drawing. Filed Oct. 10, 1967, Ser. No. 674,132
Claims priority, application Italy, Oct. 14, 1966, 28,859/66
Int. Cl. B32b 27/06
U.S. Cl. 161—227           11 Claims

ABSTRACT OF THE DISCLOSURE

Process for bonding elastomeric saturated ethylene/alpha-olefin copolymer or ethylene/alpha-olefin/polyene terpolymer of low degree of unsaturation to natural or synthetic fibers or fabric. Involves treating the fibers or fabric with aqueous dispersion containing halogenated or chlorosulfonated ethylene/propylene/polyene terpolymer and phenol-formaldehyde resin; drying the treated fabric; placing the fabric in contact with a composition of the elastomer containing a vulcanizing agent; and heating the assembled product to vulcanize the elastomer.

BACKGROUND OF THE INVENTION

Field of the invention

The present invention relates to a process for bonding natural or synthetic fibers to a saturated elastomeric ethylene/alpha-olefin copolymer or to a low-unsaturation ethylene/alpha-olefin/polyene terpolymer and to the formed articles thereby produced. More particularly it relates to a process for bonding said elastomeric polymers to fabrics, filaments and cord of rayon, nylon, polyesters, cellulose fibers and the like.

Description of the prior art

Synthetic elastomeric products of saturated ethylene/alpha-olefin copolymers or low-unsaturation ethylene/alpha-olefin/polyene terpolymers are known in the art, particularly the copolymers of ethylene with propylene and the terpolymers of ethylene with propylene a nonconjugated cyclic or acyclic diene or triene. These polymers are produced with well-known catalytic systems based on transition metal compounds and organometallic compounds and are characterized by a prevailingly amorphous structure and the absence of polar substituents or reactive sites, which gives their vulcanized products excellent resistance to ageing, oxidation and chemical attack, but makes it extremely difficult to bond these elastomers to other types of rubber or to natural or synthetic textile fibers.

A known process for bonding an unsaturated terpolymer of ethylene, propylene and a nonconjugated diene such as dicyclopentadiene or 1,4-hexadiene, to textile fibers comprises the treatment of the fibers with a condensed resorcinol-formaldehyde resin, either alone or in combination with a rubber latex. In this process, the amount of solids deposited on the fiber by the aforesaid treatment must not exceed 4% by weight of the untreated fiber, and the weight ratio of rubber (in the optional latex) to resorcinol-formaldehyde resin must not be higher than 4:1.

The rubber latexes which may be employed in combination with the phenol-formaldehyde resin, in the above process include the latexes of natural rubber; butadiene/styrene copolymers; butadiene/vinylpyridine or butadiene/vinylpyridine/styrene copolymers; isobutene/isoprene copolymers; and ethylene/propylene/nonconjugated diene terpolymers. However, it has been experimentally found that this process fails to produce satisfactory adhesion between the textile fiber and the terpolymers vulcanizable with sulfur and accelerators when dispersions of low-unsaturation ethylene/propylene/nonconjugated diene terpolymers and the resorcinol-formaldehyde resin are employed. It is also known that saturated ethylene/alpha-olefin copolymers, such as ethylene/propylene copolymers, may be bonded to textile fibers by an adhesive latex of chlorosulfonated copolymer because the chlorosulfonic acid groups impart polar character to the macromolecule and enable the polar polymer to adhere to the fiber. These chlorosulfonated copolymer latexes, however, are unable to bond textile fibers to low-unsaturation olefin terpolymers vulcanized with sulfur and accelerators.

SUMMARY

The problem of obtaining effective adhesion between textile fibers and elastomers, especially under severe stress and temperature conditions, is of particular importance in the manufacture of tires, conveyor belts and transmission belts, as well as more generally in the manufacture of rubber-coated fabrics and products in which it is desirable to bond together a natural or synthetic fibrous support and an elastomeric material.

It has now been found that good adhesion between textile fibers and low-unsaturation ethylene/alpha-olefin/nonconjugated diene terpolymers is obtained by treating the fibers with an aqueous dispersion of a phenol-formaldehyde resin and an ethylene/propylene/nonconjugated diene terpolymer which has been halogenated or chlorosulfonated.

This process is also useful for bonding textile fibers to saturated ethylene/alpha-olefin copolymers, particularly ethylene/propylene copolymers.

DESCRIPTION OF THE PREFERRED EMBODIMENTS

The present invention relates to a process for the adhesive bonding of natural or synthetic fibers to vulcanizable compositions of a saturated ethylene/alpha-olefin copolymer or an ethylene/alpha-olefin/polyene terpolymer. The bonding is accomplished through the use of a fabric-treating adhesive mixture which is essentially an aqueous dispersion of a phenol-formaldehyde resin and a halogenated or chlorosulfonated terpolymer containing up to 5% by weight of halogen.

The process of the present invention comprises:

(1) treating the fibers with aforesaid adhesive mixture until the fibers have absorbed an amount of solids between about 5% and 20% by weight of the fibers;
(2) drying the treated fibers;
(3) assembling the dried fibers in contact with the aforesaid vulcanizable composition; and then
(4) heating the assembled articles to a temperature from about 110° to 240° C., thereby vulcanizing the composition and bonding the fibers thereto.

The natural or synthetic fibers which can be bonded to the elastomers according to the present invention include rayon, nylon, polyesters, cellulose fibers and the like, in the form, for example, of filaments, plurafilaments, cords or fabrics.

The vulcanizable elastomeric compositions may contain either a saturated copolymer of ethylene and an alpha-olefin or an unsaturated terpolymer of ethylene, an alpha-olefin and a nonconjugated cyclic or acyclic polyene. The alpha-olefin monomers which may be incorporated into the elastomers include propylene and 1-butene. The saturated ethylene/alpha-olefine copolymers suitable for the present invention contain from about 20% to 80% by moles of ethylene monomer and have average molecular weight from about 60,000 to 500,000. The appropriate vulcanizing agents for these copolymers include mixtures of organic peroxides with free radical acceptors such as sulfur, diphenylguanidine or triallylcyanurate.

The unsaturated terpolymers suitable for the present invention contain as a third monomer a nonconjugated cyclic or acyclic polyene, for example: 1,5-cyclooctadiene; dicyclopentadiene; norbornadiene; methylenenorbornene; 6-methyl-4,7,8,9-tetrahydroindene; 5,6 - dimethyl-4,7,8,9-tetrahydroindene; 1,4-hexadiene; 4,8-dimethyl-1,4,9-decatriene; 1,4-cyclooctadiene; 1,6-cyclododecadiene; 1,6-heptadiene; 2-methylpentadiene; and 1,5,9-cyclododecatriene. The terpolymers are commonly prepared using catalysts based on compounds of transition metals, particularly vanadium, and organic aluminum compounds and have average molecular weight from about 50,000 to 800,000, and preferably between 60,000 and 500,000. They contain from about 20% to 80% by moles of ethylene monomer and from about 0.1% to 18% by moles of the polyene and are vulcanized with systems based on sulfur and accelerators or on organic peroxidic agents.

The terpolymers which can be modified by halogenation or chlorosulfonation for use in the adhesive mixture of the present invention contain as monomers ethylene, an alpha-olefin, and a member of the class of polyenes described above. When an unsaturated terpolymer is used in the vulcanizable composition, it is not necessary that the polyene in the modified terpolymer of the adhesive mixture be the same as the polyene in the terpolymer of the vulcanizable composition.

The chemical modification of the terpolymer for the adhesive mixture is accomplished by halogenation or chlorosulfonation of the aforesaid terpolymer. Employing known methods the halogenation, preferably chlorination or bromination, is preferably performed under ultraviolet light producing a terpolymer with halogen content from about 0.1% to 5% by weight. Alternatively, chlorosulfonation is performed with the usual chlorosulfonating agents, preferably a mixture of $SO_2$ and $Cl_2$ in a ratio of 5 to 1, to produce a terpolymer with a chlorine content from about 0.1% to 5% and a sulfur content from about 0.05% to 2%. The adhesive mixture is prepared by mixing a latex of the chemically modified terpolymer with an aqueous dispersion of a phenol-formaldehyde resin. The terpolymer latex is prepared by a known method, for example, by dissolving the modified terpolymer in a hydrocarbon to produce a solution containing from about 1% to 40% of the terpolymer and then mixing the hydrocarbon solution with an aqueous solution of 1 or more surface active agents while vigorously stirring to form an emulsion. A skimming agent such as carboximethylcellulose or sodium halogenate is then added to the emulsion, and an aqueous layer is separated after the emulsion has been permitted to settle. The organic solvent is then distilled from the remaining emulsion, preferably under reduced pressure and/or in a current of inert gas. The latex is finally concentrated further by evaporating the water until the solids content of the emulsion is between about 20% and 40%.

The surface active agents which may be used include: anionic agents such as laurylsulfate, sodium salts of polyoxyethylated phenol sulfates, and the oleates, palmitates and stearates of sodium or potassium; and nonionic agents such as polyoxyethylated alkylphenols and the polyoxyethylated alcohols. The surface active agents or mixtures thereof are used in concentrations of from about 1 to 30 parts by weight per 100 parts of chemically modified terpolymer. The latex obtained exhibits excellent stability.

To produce the adhesive mixture, the latex is mixed with an aqueous dispersion of a phenol-formaldehyde resin, preferably resorcinol-formaldehyde resin, prepared either from the preformed product or obtained in situ by mixing an aqueous solution of resorcinol with an aqueous solution of formaldehyde according to known methods, with the molar ratio of resorcinol to formaldehyde preferably about 1 to 1.

To produce the adhesive mixture, the terpolymer latex is mixed the phenol-formaldehyde dispersion, preferably in amounts which give a weight ratio of resorcinol to terpolymer between 1:2 and 1:3. Thereafter the pH of the mixture is preferably adjusted to a value between 7 and 8, and a suitable buffering agent, such as a mixture of $H_3BO_3$ and NaOH. The mixture is then matured for a time between about 20 and 80 hours to permit the condensation reaction to occur.

Fibers to be bonded to an elastomer may then be impregnated with the suitably matured adhesive mixture by methods known in the art so that they absorb an amount of solids from the dispersion, as measured by weight increase of the treated and dried fibers, of from 5% to 20%.

The dried fibers are then placed in contact with an elastomeric composition containing a suitable vulcanizing agent and such other optional ingredients as extender oils, plasticizers, reinforcing filters, antioxidants, and pigments. The assembled article is then heated to a temperature from about 110° to 220° C. to effect vulcanization of the composition.

The following description will serve to illustrate one possible method for the production of a chemically modified terpolymer of the present invention.

Four liters of a solution containing 4% of a suitable terpolymer in heptane are introduced into a six liter flask and then stirred and irradiated by two 160 w. mercury vapor lamps and chlorine is bubbled through the solution at a rate of 4 liters per hour. Under these conditions, chlorine content in the terpolymer is function of reaction time. For reaction times between 3 and 60 minutes, the chlorine bound to the terpolymer is from 0.3% to 1.8% by weight.

A mixture of methanol and acetone in a volumetric ratio of 1:1.5 is then added to the reaction mixture to precipitate the product, which is then collected, washed with methanol and then dried with heating for 30 to 40 hours.

The terpolymer may be chlorosulfonated by a procedure similar to that described for chlorination, by reacting the terpolymer with $SO_2$ and $Cl_2$ in a volumetric ratio of 5:1.

Bromination of the terpolymer may be accomplished by the dropwise addition of a solution of $Br_2$ in $CCl_4$. To obtain a bromine content between 0.3% and 1.8% by weight, between 1 and 5 g. of a 5% $Br_2$ solution may be added at room temperature and reacted with the terpolymer for 45 minutes.

The following description illustrates one preferred method for preparing the latex of chemically modified terpolymer.

To an aqueous solution of emulsifiers consisting of 7.5 g. octylphenolpolyoxymethylate (Triton X-100) and 0.75 g. sodium lauryl sulfate per liter of water, an equal volume of heptane solution containing 3–5% of the modified terpolymer is added while vigorously stirring (Kothoff turboagitator); after 30 minutes of agitation, 1 g. of carboxymethylcellulose is added per liter of water in the emulsion.

After 10 minutes more of stirring, the emulsion is transferred to a separatory funnel where part of the excess water separates in 24 hours. The remainder of the suspension is placed in a three-neck flask, and the solvent is distilled off in a current of nitrogen, under slight vacuum and with continuous stirring, while heated on a water bath at a temperature not exceeding 65–70° F. When all the solvent has been removed the latex is concentrated further by heating with stirring at 65°–70° C. to concentrate the terpolymer up to about 30–40%.

In all of the following examples, the adhesive measurements were carried out by the peeling method of ASTM D–413/39.

EXAMPLE 1

A rayon cord fabric (12 threads per cm. thread diameter=0.65 mm.) was coated with one of a series of adhesive mixtures made by adding an aqueous suspension of resorcinol-formaldehyde resin to a latex of chlorosulfonated ethylene/propylene/6-methyl-4,7,8,9-tetrahydroindene terpolymer. The latex was prepared as described above from a terpolymer of ethylene, propylene (48.5% by moles) and 6-methyl-4,7,8,9-tetrahydroindene (0.9% by moles), with a Mooney viscosity, ML (1+4), at 100° C. of 113, which has then been chlorosulfonated to a content by weight of 0.2% sulfur and 1.65% chlorine. The adhesive mixtures were composed as follows:

|   | G. |
|---|---|
| Distilled water | 6.6 |
| Resorcinol | 2.2 |
| NaOH to bring pH up to pH 8. | |
| Buffer solution | 6.25 |

Formalin (100%) as shown in Table 1.
Latex of chlorosulfonated terpolymer (40% solids) as shown in Table 1.

After drying, the fabric was bonded to an elastomeric composition compounded as follows:

|   | Parts by wt. |
|---|---|
| Terpolymer: ethylene/propylene (42 mole percent propylene)/6-methyl-4,7,8,9-tetrahydroindene [ML (1+4) 100° C.=100] | 65 |
| Polyalkylbenzene (density=0.880; η=5.6° E. at 50° C.) (Preadix 8) | 35 |
| Carbon black HAF | 30 |
| Zinc oxide | 5 |
| Phenylbetanaphthylamine | 1 |
| Mercaptobenzothiazole | 0.5 |
| Tetramethylthiouram disulfide | 1 |
| Sulfur | 2 |

Vulcanization: 150° C., 60 minutes.

The following Table 1 reports the values of the polymer rubber to rayon measured at 25° and 90° C. by the peeling test as a function of the different composition of the adhesive mixtures and of the maturing times of said mixtures.

TABLE 1.—ADHESION OF VULCANIZED TERPOLYMER COMPOSITION TO RAYON USING VARIOUS ADHESIVE MIXTURE CONTAINING CHLOROSULFONATED TERPOLYMER

| Example No. | Adhesive mixture | | | | Maturation [hr.] | Adhesion (peeling method) [kg./cm.] | |
|---|---|---|---|---|---|---|---|
| | Formalin (100%) [g.] | Latex 40% solids) [g.] | Resorcinol: formaldehyde [molar ratio] | Resorcinol: terpolymer [weight ratio] | | [1] 25° C. | [1] 90° C. |
| 1.1 | 0.3 | 2.75 | 1:0.5 | 1:0.5 | 0 | 3.5 | 1.5 |
| | | | | | 24 | 5.2 | 2.9 |
| | | | | | 48 | 5 | 3 |
| | | | | | 72 | (2) | (2) |
| 1.2 | 0.48 | 2.75 | 1:0.8 | 1:0.5 | 0 | 3 | 1 |
| | | | | | 24 | 6.3 | 3.2 |
| | | | | | 48 | 5 | 2.4 |
| | | | | | 72 | 4 | 1.9 |
| 1.3 | 0.78 | 2.75 | 1:1.3 | 1:0.5 | 0 | 3 | 1 |
| | | | | | 24 | 4 | 2 |
| | | | | | 48 | 2.5 | 0.9 |
| | | | | | 72 | (2) | (2) |
| 1.4 | 0.3 | 5.5 | 1:0.5 | 1:1 | 0 | 3.5 | 1.5 |
| | | | | | 24 | 4.5 | 2.2 |
| | | | | | 48 | 6 | 6 |
| | | | | | 72 | (2) | (2) |
| 1.5 | 0.48 | 5.5 | 1:0.8 | 1:1 | 0 | 3 | 1 |
| | | | | | 24 | 6 | 3 |
| | | | | | 48 | 5.5 | 2.8 |
| | | | | | 72 | (2) | (2) |
| 1.6 | 0.78 | 5.5 | 1:1.3 | 1:1 | 0 | 3 | 1 |
| | | | | | 24 | 4.3 | 2.2 |
| | | | | | 48 | 4 | 2 |
| | | | | | 72 | 3 | 1.25 |
| 1.7 | 0.3 | 11 | 1:0.5 | 1:2 | 0 | 2.5 | 0.8 |
| | | | | | 24 | 3 | 1.5 |
| | | | | | 48 | (2) | (2) |
| 1.8 | 0.48 | 11 | 1:0.8 | 1:2 | 0 | 2.7 | 0.8 |
| | | | | | 24 | 6 | 2.9 |
| | | | | | 48 | [3] 9 | [3] 4 |
| | | | | | 72 | [3] 10 | [3] 4.5 |
| | | | | | 96 | 7.5 | 3.45 |
| 1.9 | 0.78 | 11 | 1:1.3 | 1:2 | 0 | 2.8 | 1.7 |
| | | | | | 24 | 5.5 | 2.7 |
| | | | | | 48 | 6.5 | 3.3 |
| | | | | | 72 | 5 | 2.7 |
| | | | | | 96 | (2) | (2) |
| 1.10 | 0.3 | 16.5 | 1:0.5 | 1:3 | 0 | 2.5 | 0.8 |
| | | | | | 24 | 3 | 1.5 |
| | | | | | 38 | (2) | (2) |
| 1.11 | 0.48 | 16.5 | 1:0.8 | 1:3 | 0 | 2.5 | 0.8 |
| | | | | | 24 | 5.7 | 2.8 |
| | | | | | 48 | [3] 9.5 | [3] 4 |
| | | | | | 72 | 7 | 3.4 |
| | | | | | 96 | 3 | 1.2 |
| 1.12 | 0.78 | 16.5 | 1:1.3 | 1:3 | 0 | 2.2 | 0.7 |
| | | | | | 24 | 6.3 | 3.2 |
| | | | | | 48 | [3] 8.4 | [3] 5 |
| | | | | | 72 | 4 | 2 |

[1] Temperature of adhesion test.
[2] Adhesive mixture congulated.
[3] The adhesion value is higher than the tear resistance of the adhering mixture.

EXAMPLE 2

Different fibers were treated with an adhesive mixture containing the chlorosulfonated ethylene/propylene/6-methyl-4,7,8,9-tetrahydroindene terpolymer described in Example 7. The mixture had the following composition:

|   | G. |
|---|---|
| Distilled water | 20 |
| Resorcinol [1] | 4.4 |
| Formalin [1] (40%) | 2.7 |
| NaOH (10%) to bring pH of mixture up to pH 8. | |
| Buffer solution | 12.5 |
| Latex of chlorosulfonated terpolymer (40% solids) | 22 |

[1] Molar ratio resorcinol/formaldehyde=1:0.8; weight ratio resorcinol/rubber=1:2.

The treated and dried fibers were then assembled with the vulcanizable composition of Example 1, which contained ethylene/propylene/6-methyl-4,7,8,9-tetrahydroindene terpolymer. Vulcanization: 150° C., 60 minutes.

Table 2 reports the adhesion values found for different types of fiber.

TABLE 2.—ADHESION OF VULCANIZED TERPOLYMER COMPOSITION TO VARIOUS FABRICS USING ADHESIVE MIXTURE CONTAINING CHLOROSULFONATED TERPOLYMER

| Example No. | Fiber | Adhesion [1] (kg./cm.) at test temperatures of— | |
|---|---|---|---|
| | | 25° C. | 90° C. |
| 2.1 | Rayon | 9.5 | 4.5 |
| 2.2 | Nylon | 12 | 4.5 |
| 2.3 | Cotton | 9 | 4 |

[1] The adhesion values were higher than the values of tear resistance.

EXAMPLE 3

A rayon cord fabric was treated with an adhesive mixture containing a chlorinated terpolymer of ethylene/propylene (48.5% moles)/6 - methyl-4,7,8,9-tetrahydroindene (0.9% mole), containing 0.5% by weight of chlorine, produced as described above. The adhesive mixture had the following composition:

| | G. |
|---|---|
| Distilled water | 40 |
| Resorcinol | 5.28 |
| Formalin (40%) | 2.8 |
| NaOH (10%) to bring pH of mixture up to pH 8. | |
| Buffer solution | 5 |
| Latex of chlorinated terpolymer (40% solids) | 26.4 |

Resorcinol/formaldehyde (molar ratio)=1:0.8.
Resorcinol/chlorinated terpolymer (weight ratio)=1:2.

The treated and dried fabric was then assembled with the vulcanizable composition of Example 1. Vulcanization: 150° C., 60 minutes.

Table 3 reports the adhesion values as a function of the weight percentage by weight of chlorine in the terpolymer.

TABLE 3.—ADHESION OF VULCANIZED TERPOLYMER COMPOSITION TO RAYON USING ADHESIVE MIXTURES CONTAINING TERPOLYMER WITH VARYING DEGREES OF CHLORINATION

| Example No. | Chlorine in terpolymer (wt. percent) | Adhesion at 25° C. (peeling method) (kg./cm.) with adhesive mixture maturation (hr.) of— | | |
|---|---|---|---|---|
| | | 24 | 48 | 72 |
| 3.1 | 0 | 2.5 | 2.3 | 2.0 |
| 3.2 | 0.1 | 3.5 | 4.0 | 4.5 |
| 3.3 | 0.21 | 5.0 | 6.5 | 7.0 |
| 3.4 | 0.31 | 9.0 | 8.5 | 9.0 |
| 3.5 | 0.55 | 9.5 | 11.0 | 12.0 |
| 3.6 | 1.15 | 10.0 | 10.5 | 11.0 |
| 3.7 | 1.83 | 9.0 | 9.2 | 9.5 |
| 3.8 | 2.25 | 7.8 | 8.0 | 8.2 |

EXAMPLE 4

A square rayon cord fabric was treated with a mixture containing a brominated ethylene/propylene/6-methyl-4,7,8,9-tetrahydroindene terpolymer, having a bromine content of 1.05%, obtained as described above from the terpolymer of Example 1. The adhesive mixture had the following composition:

| | G. |
|---|---|
| Distilled water | 18 |
| Resorcinol | 2.64 |
| Formalin (40%) | 1.8 |
| NaOH (10%) to bring pH of mixture up to pH 8. | |
| Buffer solution | 2.5 |
| Latex of brominated terpolymer (20% solids) | 26.4 | with a molar ratio of resorcinal/formaldehyde=1:1 and a ratio by weight of resorcinol/brominated terpolymer=1.2. The fabric was then assembled with each of two mixes 4.1 and 4.2 containing an ethylene/propylene/6-methyl-4,7,8,9-tetrahydroindene terpolymer with different vulcanizing agents, and the assembled article was vulcanized. The composition of the two mixes was as follows:

| | Example No. | |
|---|---|---|
| | 4.1 | 4.2 |
| Vulcanization | 150° C.—60 min. | 165° C.—40 min. |
| Terpolymer: ethylene/propylene (42% mole)/6-methyl-4,7,8,9-tetrahydroindene (1% mole) (ML (1+4) 100° C.=100) | Parts by weight 65 | 65 |
| Polyalkylbenzenes (see Ex. 1) | 35 | 35 |
| Carbon black HAF | 30 | 30 |
| Zinc oxide | 5 | 5 |
| Phenylbetanaphthylamine | 1 | 1 |
| Mercaptobenzothiazole | 0.5 | |
| Tetramethylthiouram disulfide | 1 | |
| Sulfur | 2 | 0.4 |
| α,α'-Bis(tert. butyl peroxy)diisopropylbenzene | | 2.1 |

Table 4 reports the fiber-vulcanized composition adhesion values for each composition.

TABLE 4.—ADHESION OF RAYON TO DIFFERENT VULCANIZED TERPOLYMER COMPOSITIONS USING ADHESIVE MIXTURE CONTAINING BROMINATED TERPOLYMER

| Example No. | Adhesive mixture maturation (hr.) | Adhesion (peeling method) (kg./cm. at— | |
|---|---|---|---|
| | | 25° C. | 90° C. |
| 4.1 | 0 | 4.2 | 1.5 |
| | 24 | 8.5 | 4.2 |
| | 48 | 12.0 | [1] 6.5 |
| | 72 | 9.5 | 4.5 |
| 4.2 | 0 | 7.2 | 3.0 |
| | 24 | 12.0 | 6.5 |
| | 48 | 14.0 | 7.0 |
| | 72 | 13.5 | 6.5 |

[1] Adhesion value higher than tear resistance value.

EXAMPLE 5

A rayon cord fabric was treated with an adhesive mixture containing the brominated ethylene/propylene/6-methyltetrahydroindene terpolymer of Example 4.

The fabric was then dried and placed in contact with a vulcanizable elastomeric composition having the following composition:

| | |
|---|---|
| Terpolymer: ethylene/propylene (46.5% moles) 1,4-hexadiene (1.5% moles) (ML(1+4) at 100° C.=82) | 65 |
| Polyalkylbenzene (see Ex. 1) | 35 |
| Carbon black HAF | 30 |
| Zinc oxide | 5 |
| Phenylbetanaphthylamine | 1 |
| Mercaptobenzothiazole | 0.5 |
| Tetramethylthiouram disulfide | 1 |
| Sulfur | 2 |

Vulcanization: 150° C., 60 minutes.

Table 5 reports the values of the terpolymer rubber-rayon adhesion.

TABLE 5.—ADHESION OF RAYON TO VULCANIZED COMPOSITION USING ADHESIVE MIXTURE CONTAINING BROMINATED TERPOLYMER

| Adhesive mixture maturation | Adhesion (kg./cm.) at temperatures of— | |
|---|---|---|
| | 25° C. | 90° C. |
| Hours: | | |
| 0 | 2.6 | 1.2 |
| 24 | 3.0 | 2.7 |
| 48 | 11 | [1] 5.5 |
| 72 | 11.5 | [1] 5.5 |

[1] Adhesion value higher than tear resistance value.

EXAMPLE 6

A rayon cord fabric was treated with an adhesive mixture containing the brominated ethylene/propylene/6- methyl-4,7,8,9-tetrahydroindene terpolymer of Example 4. The mixture having the following composition:

| | G. |
|---|---|
| Distilled water | 18 |
| Resorcinol | 2.64 |
| Formalin (40%) | 1.8 |
| NaOH (10%) to bring pH of mixture up to pH 8. | |
| Buffer solution | 2.5 |
| Latex of brominated terpolymer (20% solids) | 26.4 |

Resorcinol/formaldehyde (molar ratio)=1:1.
Resorcinol/brominated terpolymer (weight ratio)=1:2.

The treated fabric was dried and then assembled with each of two elastomeric mixes containing ethylene/propylene copolymer, these mixes having for following composition:

| | Example No. | |
|---|---|---|
| | 6.1 | 6.2 |
| | Parts by weight | |
| Copolymer of ethylene/propylene (45% moles) (ML (1+4) 100° C.=60) | 75 | |
| Copolymer of ethylene/propylene (45% moles) (ML (1+4) 100° C.=23) | | 100 |
| Polyalkylbenzene (See Example 1) | 25 | |
| Carbon black HAF | 30 | |
| Carbon black GPF | | 20 |
| Carbon black FEF | | 15 |
| Zinc oxide | 5 | 5 |
| Polymerized 2,2,4-trimethyl-1,2-dihydroquinoline (antioxidant) | 0.5 | 0.5 |
| α,α'-Bis(tert. butylperoxy)diisopropylbenzene | 2.1 | 1.64 |
| Sulfur | 0.4 | 0.28 |

Note.—Vulcanization: 40 minutes—165° C.

Table 6 reports the fiber-vulcanized composition adhesion value for each compound.

TABLE 6.—ADHESION OF RAYON TO DIFFERENT VULCANIZED COPOLYMER COMPOSITIONS USING ADHESIVE MIXTURE CONTAINING BROMINATED TERPOLYMER

| Example No. | Adhesive mixture maturation (hr.) | Adhesion (peeling method) (kg./cm.) at test temperatures of— | |
|---|---|---|---|
| | | 25° C. | 90° C. |
| 6.1 | 0 | 3.5 | 1.25 |
| | 24 | ¹8.0 | ¹3.5 |
| | 48 | ¹7.5 | ¹3.5 |
| | 72 | ¹8.0 | ¹3.5 |
| 6.2 | 0 | 2.7 | 1.3 |
| | 24 | ¹12.5 | ¹6.5 |
| | 48 | ¹12.0 | ¹6.5 |
| | 72 | ¹12.5 | ¹6.3 |

¹ Adhesion value higher than tear resistance value.

EXAMPLE 7

The latex of chlorosulfonated terpolymer of Example 1 was employed in an adhesive mixture having the following composition:

| | G. |
|---|---|
| Distilled water | 6.6 |
| Resorcinol | 2.2 |
| Formalin (40%) | 1.2 |
| NaOH (10%) to bring pH of mixture up to pH 8. | |
| Buffer solution | 6.25 |
| Latex of chlorosulfonated terpolymer (40% solids) | 11 | which was used to treat 100 square meters of rayon cord fabric (type 2200/3) commonly employed in the manufacture of tires.

The fabric was then rubber-coated with the vulcanizable composition of Example 1 and finally was used to make 2-ply tires (5.20/14) by known methods. The tread and sidewalls were formed by extrusion through a flat die from the following composition:

| | Parts by wt. |
|---|---|
| Terpolymer: ethylene/propylene (42% moles)/6-methyl-4,7,8,9-tetrahydroindene (1% moles) (ML (1+4) 100° C.=100) | 65 |
| Polyalkylbenzene (see Ex. 1) | 35 |
| Carbon black ISAF | 55 |
| Zinc oxide | 5 |
| Phenylbetanaphthylamine | 1 |
| Stearic acid | 0.5 |
| Mercaptobenzothiazole | 0.5 |
| Tetramethylthiouram disulfide | 1 |
| Sulfur | 2 |

The tires were vulcanized in the mold with steam at 15 atmospheres (jacket and bag) for 15 minutes, and were then tested on high speed test wheel at a speed of 60 km./hour and with a load of 600 kg./axle without the slightest loosening of the terpolymer tread from the plies.

EXAMPLE 8

A rayon cord fabric was treated with an adhesive mixture containing 40% of brominated terpolymer of ethylene/propylene (47% moles)/1,4-hexadiene (1% moles), containing 1.07% bromine prepared as described above from a terpolymer having Mooney viscosity ML (1+4) 100° C.=82. The adhesive mixture had the following composition:

| | G. |
|---|---|
| Distilled water | 18 |
| Resorcinol | 2.64 |
| Formalin (40%) | 1.8 |
| NaOH (10%) to bring pH of mixture up to pH 8. | |
| Buffer solution | 2.5 |
| Latex of brominated terpolymer (20% solids) | 26.4 |

Resorcinol/formaldehyde (molar ratio)=1:2.
Resorcinol/brominated terpolymer (weight ratio)=1:2.

The treated fabric was dried and then assembled with the elastomeric composition of Example 1, which contained ethylene/propylene/6-methyl-4,7,8,9-tetrahydroindene terpolymer. Vulcanization: 150° C., 60 minutes.

TABLE 8.—ADHESION OF RAYON TO VULCANIZED COMPOSITION

| | Adhesion (kg./cm.) at— | |
|---|---|---|
| | 25° C. | 90° C. |
| Maturation (hours): | | |
| 0 | 3.5 | 1.7 |
| 24 | 7.0 | 3.2 |
| 48 | 11.0 | ¹5.5 |
| 72 | 11.0 | ¹5.5 |

¹ The values of adhesion are higher than the values of tear resistance of the adhering elastomeric mix.

In order to demonstrate the difficulty of bonding textile fibers and low unsaturation elastomeric terpolymer without employing both the latexes of modified terpolymer and the specified operating conditions of the present invention, especially if the prior art is followed, the results of several tests are presented below.

EXAMPLE 9

Three rayon cord fabrics were treated with three different latexes, one containing 40% of ethylene/propylene (47% moles)/1,4-hexadiene(1% moles) terpolymer which had been brominated (1.07% bromine content), the second wherein the terpolymer had been chlorinated (0.5% chlorine content), the third wherein the terpolymer had been chlorosulfonated (to contain 1.65% of chlorine and 0.2% of sulfur by weight). The solids content of the treated fiber was 5.6% in each case. No phenol-formaldehyde resin was used.

After drying, the fabric was placed in contact with the elastomeric composition of Example 1. Vulcanization: 160° C., 50 minutes.

The adhesions obtained, measured in accordance with the peeling method and expressed in kg./cm., exhibit the values reported hereunder:

TABLE 9.—ADHESION OF RAYON TO VULCANIZED COMPOSITION USING LATEXES OF MODIFIED TERPOLYMERS WITHOUT PHENOLIC RESIN

| Example No. | Latex | Adhesion (kg./cm.) at 35° C. |
| --- | --- | --- |
| 9.1 | Brominated terpolymer | 1.1 |
| 9.2 | Chlorosulfonated terpolymer | 1.1 |
| 9.2 | Chlorinated terpolymer | 1.2 |

From the adhesion values of Table 9, it can be seen that using an adhesive mixture consisting only of the aqueous latex of the modified terpolymer does not produce efficient adhesion.

EXAMPLE 10

A rayon cord fabric was treated with an adhesive composition containing phenol-formaldehyde resin and latex of saturated ethylene/propylene (55% moles) copolymer which was chlorosulfonated (1.8% of chlorine, 0.8% of sulfur). The mixture had the following composition:

|  | G. |
| --- | --- |
| Distilled water | 13.3 |
| Resorcinol | 4.4 |
| Formalin (40%) | 4.1 |
| NaOH (10%) to bring pH of mixture up to pH 8. | |
| Buffer solution | 12.5 |
| Latex of chlorosulfonated copolymer (40% solids) | 15 |

The fiber was then dried and assembled with the vulcanizable composition of Example 1. Vulcanization: 160° C., 50 minutes.

TABLE 10.—ADHESION OF RAYON TO VULCANIZED COMPOSITION USING PHENOLIC RESIN AND CHLOROSULFONATED COPOLYMER

| | Adhesion (kg./cm.) at test temperatures of— | |
| --- | --- | --- |
| | 25° C. | 90° C. |
| Adhesion mixture maturation (hours): | | |
| 1 | 2.5 | 1 |
| 24 | 1.5 | 0.7 |
| 48 | 1.5 | 0.7 |
| 72 | 1.5 | 0.7 |

The values of Table 10 show that the use of an aqueous dispersion of phenol-formaldehyde resin and a latex of modified saturated ethylene-alpha-olefin copolymer fails to produce sufficient adhesion.

EXAMPLE 11

A rayon cord fabric was treated with a solution of phenolic resin without an elastomeric resin latex, having the following composition:

|  | G. |
| --- | --- |
| Disilled water | 100 |
| Resorcinol | 11 |
| Formalin (40% solids) | 7.8 |
| NaOh (10%) to bring pH of mixture up to pH 8. | |

After during, the fiber was placed in contact with the composition described in Example 1. Vulcanization: 160° C., 50 minutes.

TABLE 11

Adhesion of rayon vulcanized composition using phenolic resin

| Adhesion (peeling) (kg./cm.) | ° C. |
| --- | --- |
| 1.0 | 25 |
| 0.2 | 90 |

EXAMPLE 12

An adhesive resin was prepared by mixing 23 g. of 95% resorcinol, 4.4 g. of 95% paraformaldehyde, and 4.0 cc. of water, heating slightly and agitating in a 250 cc. beaker.

The mixture was heated at 100° C. for 3 minutes and stirred vigorously while the temperature was raised to 132° C., heating was then stopped, and the mixture was allowed to stand for 1 hour, during which time it cooled to 30° C. Heating was resumed, bringing the temperature to 130–140° C. for 20 minutes.

An adhesive composition was then prepared from:

|  | G. |
| --- | --- |
| Resin | 16 |
| Ammonium hydrate (25%) | 6 |
| Water | 78 |
| Total (16% solids) | 100 |

(12.1) In a first case, a rayon cord fabric was treated with an adhesive mixture consisting of:

|  | G. |
| --- | --- |
| Water | 44.95 |
| Adhesive composition (16% solids) | 9.38 |
| Formaldehyde (8.5%) | 2.34 |
| Total | 56.67 | to produce a 3.3% increase by weight of dried fiber. The treated fiber was then bonded, by vulcanization at 150° C. for 60 minutes, to a terpolymer mix having the following composition:

|  | G. |
| --- | --- |
| Terpolymer: ethylene/propylene (42% moles)/6-methyl-4,7,8,9-tetrahydroindene (1% moles) (ML(1+4, at 100° C.=100) | 100 |
| Carbon black FEF | 36 |
| Carbon black HAF | 36 |
| Paraffin oil FL 65—commercial product of Montecatini | 40 |
| Stearic acid | 1 |
| Zinc oxide | 5 |
| Mercaptobenzothiazole | 0.5 |
| Tetramethylthiouram monosulfide | 1.5 |
| Sulfur | 3.0 |
| Total | 223.0 |

(12.2) In a second case, the rayon cord fabric was treated with an adhesive mixture comprising a latex of non-modified ethylene/propylene (55% by weight)/1,4,-hexadiene (4% by weight) terpolymer having the following composition:

|  | G. |
| --- | --- |
| Distilled water | 71.45 |
| Terpolymer latex (40%) | 2.50 |
| Adhesive composition (16% solids) | 9.38 |
| Total | 83.33 | to produce 1.7% increase by weight of the dried fiber.

After drying, the treated fiber was placed in contact with an elastomeric mixture having the composition described in the preceding Example 12.1. Vulcanization: 160° C., 50 minutes. The adhesion values measured at 25° and 90° C. according to the peeling method, are reported in Table 12, as a function of the maturing times of the adhesive composition used.

TABLE 12.—ADHESION OF RAYON TO VULCANIZED COMPOSITION USING ADHESIVE MIXTURE WITHOUT POLAR TERPOLYMER

| Example No. | Adhesive mixture | | Adhesion (kg./cm.) at test temperatures of— | |
| --- | --- | --- | --- | --- |
| | Terpolymer | Maturation (hrs.) | 25° C. | 90° C. |
| 12.1 | None | 0 | 2.3 | 1. |
| | | 24 | 2.2 | 1.1 |
| | | 48 | (¹) | (¹) |
| 12.2 | Non-polar | 0 | 3.5 | 1.7 |
| | | 24 | 3.4 | 1.5 |
| | | 48 | 3.4 | 1.5 |

¹ Coagulation of adhesive mixture.

Variations can, of course, be made without departing from the spirit and scope of the invention.

What we desire to secure by Letters Patent and hereby claim is:

1. In a method for adhering (1) a saturated copolymer of ethylene with an alpha-olefin or (2) a terpolymer of ethylene with an alpha-olefin and a cyclic or acyclic polyene having non-conjugated double bonds, said terpolymer having a low degree of unsaturation, to natural or synthetic fibers, said method comprising impregnating said fibers with an alkaline aqueous dispersion of phenol-formaldehyde resin and an aqueous elastomeric latex containing one or more surface-active agents, the pH of said dispersion of latex and phenol-formaldehyde resin being adjusted to from about 7 to 8 and said dispersion having been matured for a time of from about 20 to 80 hours so as to effect a solids content in the treated fibers, on a dry basis, of from about 5 to 20% by weight, drying the thus treated fibers, assembling said fibers with an elastomeric mixture containing the above defined copolymer or terpolymer and also containing a vulcanizing agent, and vulcanizing by heating at a temperature of from about 110° to 220° C., the improvement comprising employing as the elastomeric component of said latex a chemically modified terpolymer selected from the group consisting of halogenated and chlorosulfonated terpolymers of ethylene, an alpha-olefin and a cyclic or acyclic polyene, said terpolymer containing from about 0.1 to 5% by weight of halogen.

2. The method of claim 1 wherein the chemically modified terpolymer is a chlorinated terpolymer of ethylene-propylene-polyene containing from 0.1 to 5% by weight of chlorine.

3. The method of claim 1 wherein the chemically modified terpolymer is a brominated terpolymer of ethylene-propylene-polyene containing from 0.1 to 5% of bromine.

4. The method of claim 1 wherein the chemically modified terpolymer is a chlorosulphonated terpolymer of ethylene-propylene-polyene containing from 0.1 to 5% by weight of chlorine and from 0.05 to 2% by weight of sulphur.

5. The method of claim 1 wherein said cyclic or acyclic polyene of the terpolymer is a diene or triene selected from the group consisting of cyclo-octadiene-1,5; dicyclo-pentadiene; norbornadiene; methylen-norbornene; 6-methyl-4,7,8,9-tetrahydroindene; hexadiene-1,4; 5,6-dimethyl - 4,7,8,9 - tetrahydroindene; 4,8-dimethyl-1,4,9-decatriene; cyclo-octadiene - 1,4; cyclo-dodecadiene-1,6; heptadiene - 1,6; 2-methyl-pentadiene; and cyclo-dodecatriene-1,5,9.

6. The method of claim 1 wherein a non-modified terpolymer is adhered to said fibers, said terpolymer and said chemically modified terpolymer having a molecular weight of from about 50,000 and 800,000, an ethylene content of from about 20 to 80 mole percent, and a polyene content of from about 0.1 to 18 mole percent.

7. The method of claim 1 wherein an ethylene-alpha-olefin copolymer is adhered to said fibers, said copolymer being a copolymer of ethylene/propylene or ethylene/butene-1 and having a molecular weight from about 60,000 and 500,000 and an ethylene content of from about 20 to 80 mole percent.

8. The method of claim 1 wherein the vulcanizing agent in the copolymer or terpolymer mixture includes an organic peroxide, sulphur, or both.

9. The method of claim 8 wherein the vulcanizing agent additionally includes accelerators.

10. The method of claim 1 wherein the fibers are of a polyamide, cotton, or rayon.

11. The vulcanized product obtained by the method of claim 1.

References Cited

UNITED STATES PATENTS

| | | | |
|---|---|---|---|
| 3,060,078 | 10/1962 | Atwell | 156—335 |
| 3,427,183 | 2/1969 | Portolani et al. | 156—110X |

FOREIGN PATENTS

| | | | |
|---|---|---|---|
| 1,071,528 | 6/1967 | Great Britain | 156—110 |

LELAND A. SEBASTIAN, Primary Examiner

U.S. Cl. X.R.

117—161; 152—359; 156—110, 333; 161—60, 88, 92, 248, 253, 257; 260—29.3, 80.78

PO-1050
(5/69)

UNITED STATES PATENT OFFICE
CERTIFICATE OF CORRECTION

Patent No. 3,577,310                 Dated May 4, 1971

Inventor(s) Luigi Torti and Guido Bertelli

It is certified that error appears in the above-identified patent and that said Letters Patent are hereby corrected as shown below:

Column 4, line 48, "of chemically" should read -- of the chemically --; line 63, "65-70°F" should read -- 65-70°C --; line 72, "cm." should read -- cm., --. Columns 5 and 6, lines 12 and 13, Table 1, in the heading, third column, "Latex 40% solids)[g]" should read -- Latex (40% solids)[g] --; Table 1, Example 1.10, under the heading "Maturation [hr.]", (sixth column of the Table), "38" should read -- 48 --. Column 6, line 54, "Example 7" should read -- Example 1 --; the solid line between lines 72 and 73 should be deleted. Column 7, line 48, Table 3, Example 3.4, under the heading "24" (third column of the Table), "9.0" should read -- 7.0 --. Column 8, line 35, "Adheslon" should read -- Adhesion --. Column 10, line 37 "(molar ratio)=1:2" should read -- (molar ratio)=1:1. --. Column 11, line 8, Table 9, in the heading of last column, "at 35°C." should read -- at 25°C. -- line 12, Table 9, first column, last line (under the heading "Exampl No."), "9.2" should read -- 9.3 --. Column 12, line 32, "(ML(1+4, at 100°C.=100)" should read -- (ML (1+4), at 100°C.=100) --; line 70, Table 12, first line in the Table, last column (under the heading "90°C."), "1." should read -- 1.1 --.

Signed and sealed this 26th day of October 1971.

(SEAL)
Attest:

EDWARD M. FLETCHER, JR.          ROBERT GOTTSCHALK
Attesting Officer                Acting Commissioner of Patents

PR